Sept. 14, 1965  P. FORTESCUE ETAL  3,206,369
FUEL ELEMENTS FOR NUCLEAR REACTORS
Original Filed Dec. 16, 1957  4 Sheets-Sheet 4
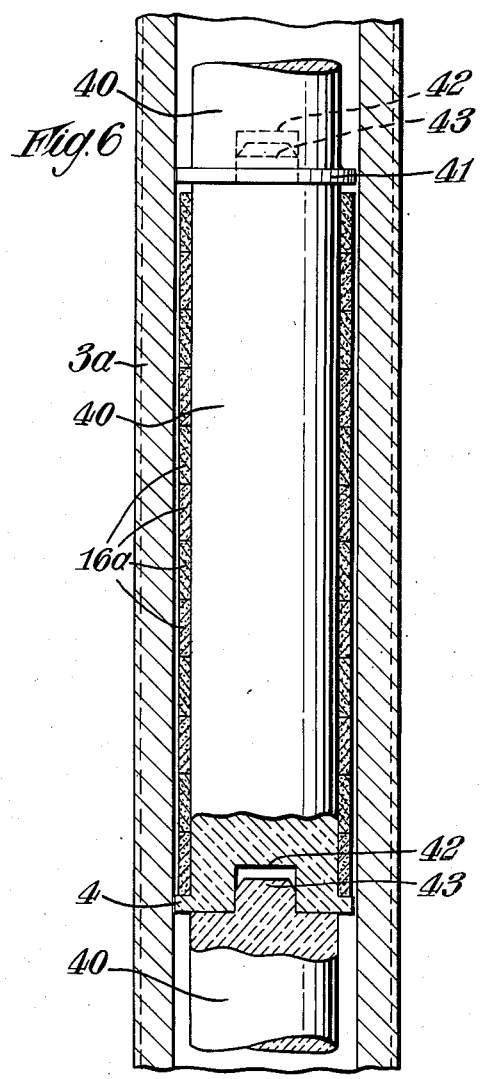

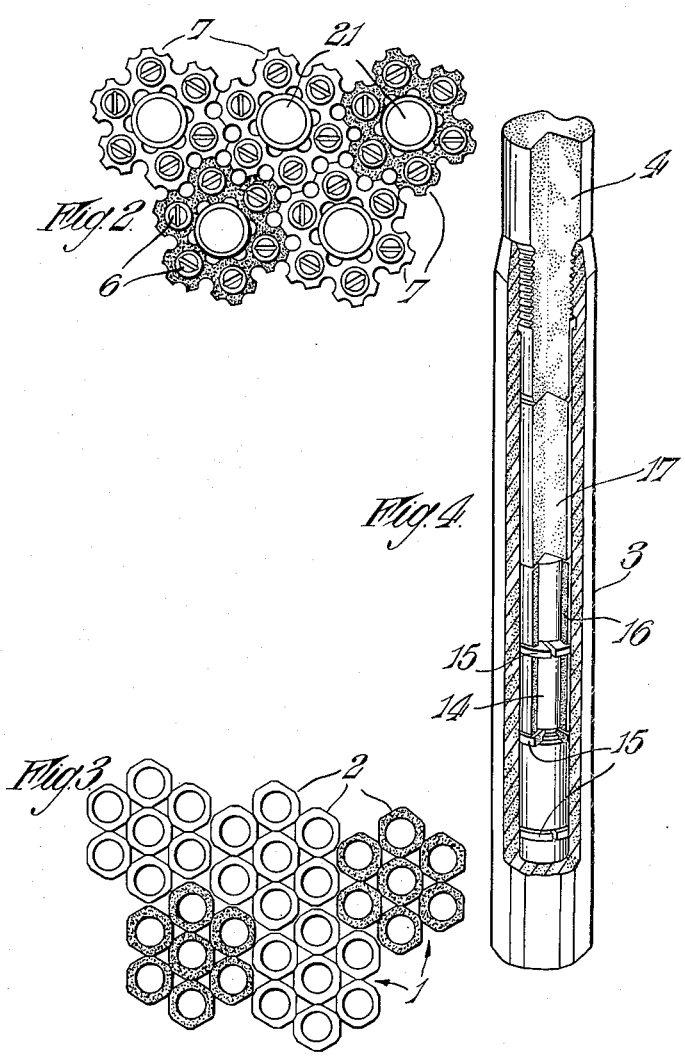

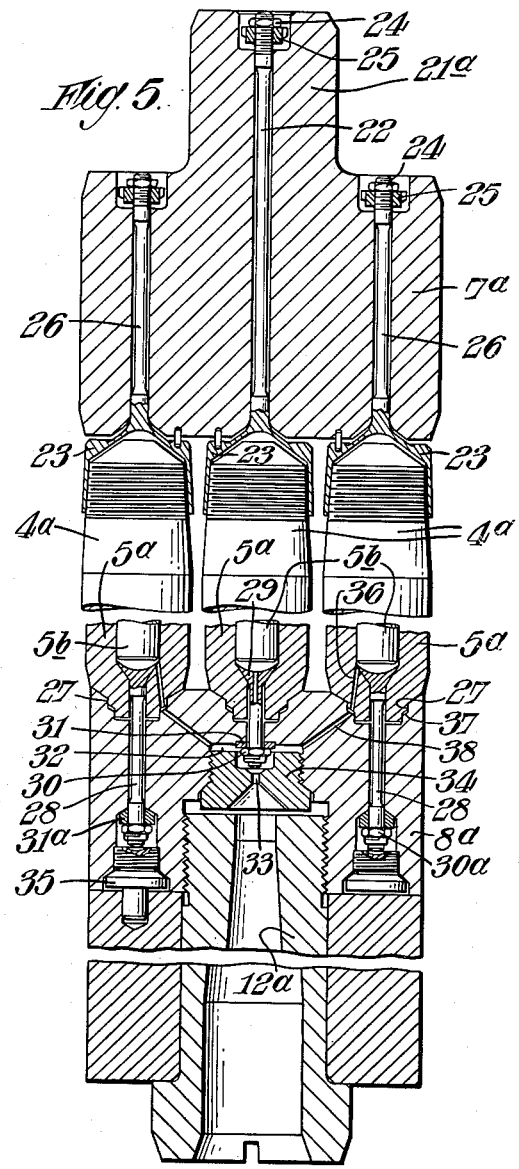

United States Patent Office 3,206,369
Patented Sept. 14, 1965

3,206,369
FUEL ELEMENTS FOR NUCLEAR REACTORS
Peter Fortescue, Zurich, Switzerland, and George Edward Lockett, Parkstone, Dorset, England, assignors to United Kingdom Atomic Energy Authority, London, England
Original application Dec. 16, 1957, Ser. No. 703,095, now Patent No. 3,039,947, dated June 12, 1962. Divided and this application June 15, 1961, Ser. No. 117,480
4 Claims. (Cl. 176—37)

This is a voluntary division of application S.N. 703,095, now U.S. Patent 3,039,947, filed December 16, 1957.

This invention relates to core elements for nuclear reactors and is concerned with improvements and modifications of the elements described in the specification of our co-pending patent application No. 651,409, now abandoned.

In said specification a core element is described which comprises a tubular container of moderating substance, a fuel supporting rod having a helical recess or recesses within the container and fissile material in the recess.

According to the present invention the rod is formed with annular recesses and the fissile material or fuel is in the form of sleeves loosely contained in said recesses. The rod may be of composite construction and may be formed with annular grooves into which radially split rings are fitted to constitute flanges defining said recesses. In a preferred construction the rod comprises a series of sections each formed with a flange at one end and arranged to be assembled end to end, spigot and socket connections ensuring axial alignment. The fuel of the present invention is preferably diluted or chemically combined with moderating material and/or fertile material in which case a reactor containing such elements constitutes a so-called solid homogeneous reactor. An advantage of this type of reactor is that very high heat release rates and surface temperatures are possible. Heat is transferred from the fuel to its container by radiation and thus by conduction through the container to a coolant. The container thus functions as a "sheath" as well as a moderator but since heat is transferred by radiation from the fuel to the sheath there is no necessity for close heat-conducting contact between them and the fuel may be made a loose fit within the sheath or container, thus permitting damage and distortion of the fuel to take place without affecting the operation of the reactor.

In a preferred construction suitable for use in the reactor described in the specification of our co-pending patent application No. 651,409, now abandoned seven core elements of the invention are located between top and bottom spiders to form a cluster and a plurality of such clusters are assembled to constitute the core of the reactor.

Features of the invention reside in the method of constructing and mounting such clusters of elements and in the means provided for venting the interior of the elements.

The nature of the invention will be more readily understood if reference is made to the accompanying drawings.

In the drawings:

FIG. 2 is a plan view of FIG. 1.

FIG. 3 is a diagrammatic sectional plan of FIG. 1.

FIG. 4 is a cut-away perspective view to a larger scale of a fragment of a core element of FIG. 1.

FIG. 5 is a vertical central cross section to a larger scale of a modified cluster construction and FIG. 6 is a vertical central cross section to a yet larger scale of fragment of a modified core element.

Figure 1:
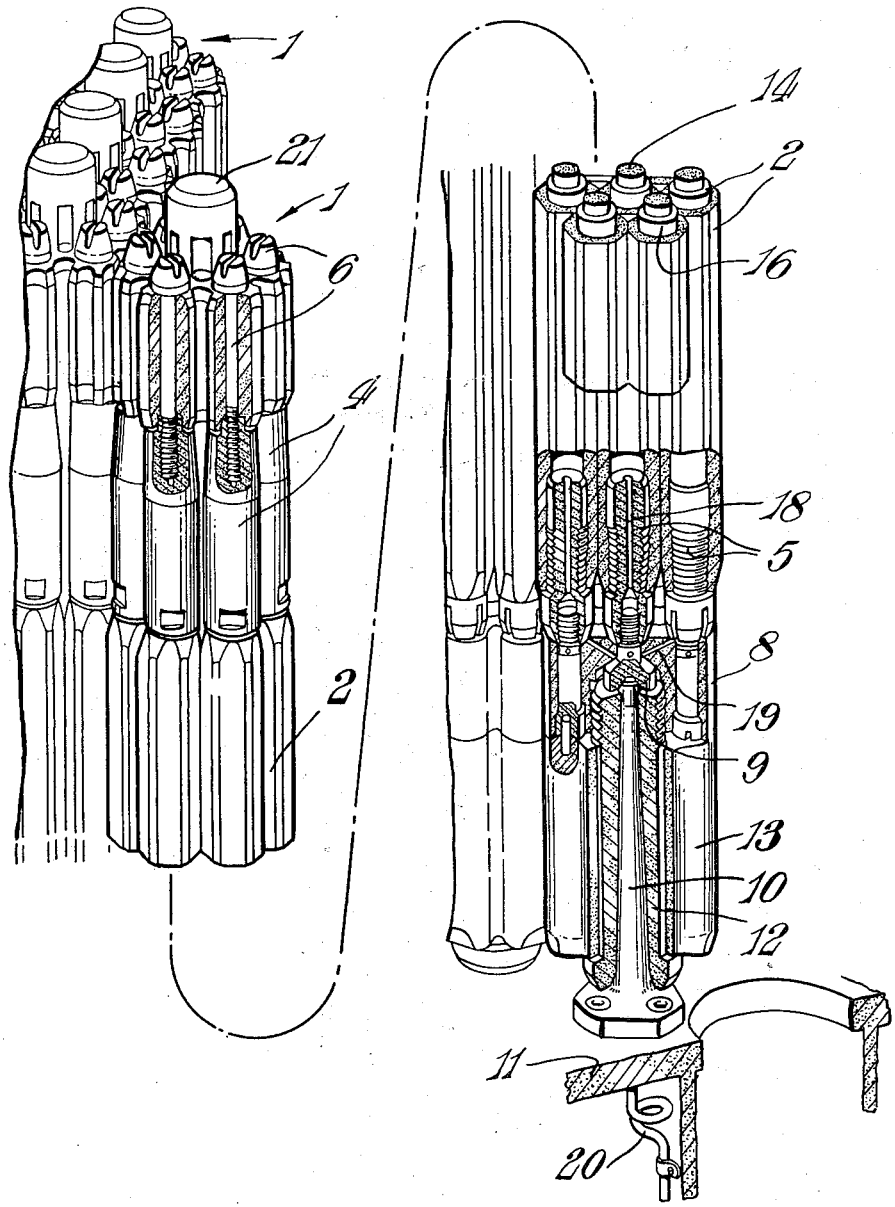
FIG. 1 is a perspective view of several clusters, the elements of one cluster being partly broken away and sectioned.

Each cluster 1 consists of seven core elements 2 each comprising an outer graphite tube 3 which, in section, has a hexagonal outline and a circular bore of, say, 1½ in. diameter. Each tube 3 which is about 6 ft. long is closed by graphite plugs the top by a screw plug 4 and the bottom by a screw plug 5. Each of the plugs 4 and 5 has a threaded hole in its outer end. The outer six of the top plugs 4 are secured by graphite bolts 6 to the underside of a graphite top spider 7 and the outer six of the bottom plugs 5 are secured to the top of a graphite bottom spider 8. The centre bottom plug 5 is secured to the spider 8 by a graphite bolt 9 having a recessed head which functions as a socket and gas seal for mounting the element on the tip of a spike 10 attached to a frame 11 mounted within the pressure shell (not shown) of a reactor. The centre top plug 4 engages a central (not shown) on the underside of the top spider 7 which latter is provided with a central extension 21 adapted to be engaged by grappling means.

A graphite sleeve 12 is threaded into a central recess in the bottom of the bottom spider 8, the sleeve has a tapered bore of slightly greater angle than the taper of the spike 10 to allow a slight pivotal movement. The sleeve 12 also serves to secure a graphite reflector block 13 to the bottom of the element.

Within each tube 3 is a graphite fuel supporting rod 14 formed at intervals with annular grooves into which split graphite rings 15 are fitted and between each ring is a loose fitting sleeve 16 containing fissile material and constituting the fuel. A spacer 17 is provided at each end between the rod 14 and the end plugs 4 and 5. It will be appreciated that these spacers 17 and the plugs and spiders beyond them constitute neutron reflecting members.

Each of the bottom plugs 5 has a central bore 18 which communicates through channels 19 with the socket in the centre plug 5. Thus the interior of each rod 2 is in communication with the spike 10 which has a centre bore connected to a pipe 20. The pipes 20 from each spike are connected to a manifold outside the pressure vessel.

A preferred method of securing the screw plugs 4 and 5 to the top and bottom spiders 7 and 8 is shown to a larger scale in FIG. 5 in which corresponding components have been given the same reference number with the suffix *a*.

In FIG. 5 the centre top plug 4*a* is shown connected to the upper spider 7*a* by means of a heat resisting stainless steel bolt 22 having, at its lower end, an internally threaded cupped head 23 which screws over the threaded upper end of the plug 4*a* and, at its upper end, a nut 24 and lock nut 25. The coefficients of expansion of the bolt 22 and the graphite of the spider 7*a* and plug 4*a* are such when the reactor is cold the parts 23 and 4*a* are held together firm enough to allow the cluster of core elements to be lifted and transported by grappling means applied to the extension 21*a* whereas at the operating temperature of the reactor the cupped head 23 expands and crushing of the graphite is avoided.

The outer top plug 4*a*, of which two are shown in the section, are similarly connected to the spider 7*a* by heat resisting stainless steel bolts 26 with cupped heads 23, nuts 24 and lock nuts 25.

The lower spider 8*a* is formed with stepped sockets 27 to receive the lower ends of the bottom plugs 5*a*. These plugs 5*a* are hollow and are loosely filled with graphite rods 5*b* to provide as much neutron reflecting material as possible without interfering with the venting of the elements. The plugs 5*a* are secured in the sockets 27 by hexagon headed steel (Nilo 40) bolts 28 and 29, nuts 30 and compensating washers 31 made of a stainless steel having a much higher coefficient of expansion than the bolts.

The bolt 29 is hollow to allow the passage of voltaile fission products from the core element associated with the centre plug 5a to a manifold space 32 closed, but for an orifice 33, by a graphite screw plug 34.

The bolts 28 are solid and longer than the central bolt 29 but are otherwise similar and are furnished with compensating washers 31a and nuts 30a which are well recessed in the spider 8a covered by graphite plugs 35. Release of volatile fission proucts from the core elements associated with each outer plug 5a is provided via a passage 36 in each said plug, an annular clearance 37 and a passage 38 corresponds to each element in the spider 8a. The passages 38 communicate with the manifold space 32.

The provision of compensating washers on the bolts 28 and 29 ensures that the core elements are firmly secured to the lower spider over the working temperature range. The stepped sockets 27, however, ensure a substantially gas tight seal despite some relative movement since the plugs 5a are a tight sliding fit in said sockets.

Similarly to the embodiment illustrated in FIG. 1, a graphite sleeve 12a having a tapered bore is threaded into a central recess in the bottom of the spider 8a and serves to secure a reflector block 13a.

FIG. 6 shows a preferred construction for the fuel supporting rod. The rod comprises a plurality of graphite rod sections 40 each having a flange 41 and a socket 42 at its lower end and a spigot 43 at its upper end. The diameter of the flange 41 is such as to be a loose sliding fit within the circular bore of the graphite containing tube 3a. For example, allowing for manufacturing tolerances, a clearance of 2 to 7 thousandths of an inch is provided on a diameter of 1½ in.

A plurality of graphite sleeves 16a contatining about 1 atom in 1000 of fissile material are mounted on each section 40 before the sections are assembled end to end and inserted within the tube 3a. The sleeves 16a are loose sliding fit over the rod sections but are a much looser fit within the bore of the tube 3a, having a minimum initial clearance when mounted concentrically of about 40 thousandths of an inch. Thus allowing for the maximum possible additive eccentricity of both the sleeves and the rod, there is still a substantial clearance between the sleeves and the bore of the tube.

For a tube bore diameter of 1½ in., each rod section 40 may be about 6 in. long, about twelve fuel sleeves 16a, being stacked on each section. Thus for a tube length of 6 ft. there are say ten rod sections 40 and a spacer 17 (FIG. 4) at each end. A substantial clearance (equal to about one half the length of one sleeve 16a) is allowed between the top of each stack and the flange 41 of the rod section above.

The sleeves 16a may be formed by cold-compacting an intimate mixture of highly purified synthetic graphite ("pile" graphite) powder and powdered fissile and/or fertile material.

In FIG. 3 the dark shading is used to distinguish seven elements 2 which form a cluster 1. It can be seen that six triangular section channels are left between each element 2 its adjacent element for the passage of coolant.

Accurate location and spacing of the clusters is effected by the top spiders 7 as shown in FIG. 2 and movement due to growth or thermal expansion is free to occur as a combined outward and upward movement of the clusters. The assembly of clusters is preferably held together by the pressure of incoming coolant acting so as to clamp the periphery of the assembly (constituting the reactor core) via a surrounding graphite reflector as described in the specification of our patent application No. 703,050 now U.S. Patent 3,034,976.

We claim:
1. In combination with a plurality of nuclear fuel elements having tubular graphite containers, means joining the fuel elements in a cluster for cooling from a common gas source comprising a pair of spider-like members of neutron moderating material having the fuel elements engaged therebetween in spaced parallel relationship, one of said spider-like members having means connected therewith adapted to be engaged by grappling means, and the other of said spider-like members having means defining a manifold communicating with the interior of each of the tubular containers through ducts for venting volatile fission products and coolant which permeates through the container wall.

2. The combination according to claim 1 wherein the ends of the tubular containers are connected with the spider-like members by neutron moderating bolts.

3. In a nuclear reactor core having support means therein, a fuel element assembly mounted on the support means and comprising a pair of spider-like members of neutron moderating material and a plurality of fuel elements having tubular graphite containers engaged at their ends between the spider-like members in spaced parallel relationship to form a cluster, one of said spider-like members defining a manifold communicating with the interior of each of the tubular containers through ducts for venting volatile fission products and coolant which permeates through the container wall, the other of said spider-like members having means connected therewith adapted to be engaged by grappling means, and means for conducting said vented fission products and coolant away from the reactor core.

4. A nuclear reactor core according to claim 3 wherein said conducting means includes a spider-like member on the support means on which the fuel element assembly rests, said spike-like member having a passage therein communicating with the manifold.

References Cited by the Examiner

UNITED STATES PATENTS

| | | | |
|---|---|---|---|
| 2,782,158 | 2/57 | Wheeler | 176—59 |
| 2,879,216 | 3/59 | Hurwitz | 176—43 |
| 2,898,280 | 8/59 | Schultz | 176—78 |
| 3,039,947 | 6/62 | Fortescue et al. | 176—71 |

OTHER REFERENCES

International Conference on Peaceful Uses of Atomic Energy 1955, Geneva, vol. 3, pp. 295–302.

CARL D. QUARFORTH, *Primary Examiner.*

REUBEN EPSTEIN, *Examiner.*